Sept. 15, 1953 A. S. VANDERHOOF 2,652,522
RECTIFIER STACK
Filed June 23, 1949

INVENTOR
ALTON S. VANDERHOOF
BY
ATTORNEY

Patented Sept. 15, 1953

2,652,522

UNITED STATES PATENT OFFICE 2,652,522

RECTIFIER STACK

Alton S. Vanderhoof, Maplewood, N. J., assignor to Federal Telephone and Radio Corporation, New York, N. Y., a corporation of Delaware Application June 23, 1949, Serial No. 100,891

1 Claim. (Cl. 317—234)

This invention relates to dry or plate rectifiers and more particularly to assemblies of terminal strips and one or more rectifier plates.

Rectifier assemblies, usually referred to as rectifier stacks, have heretofore comprised a plurality of rectifier plates or discs each having an opening therethrough for mounting upon a tie bolt or metal eyelet. The rectifier plates are usually separated by spacer washers and insulated from the tie bolt or eyelet by an insulating sleeve. Two or more terminal strips are also mounted on the tie bolt in contact with certain of the rectifier plates or spacer washers. Where a tie bolt is used insulating washers are required at both ends of the tie bolt and a nut is used to hold the assembly in tight relation. Where a metal eyelet is used, the eyelet is likewise insulated at its ends by means of insulating washers and metallic washers over which the eyelet is swedged to form a tight assembly.

An object of the present invention is to simplify the assembly structure heretofore used, to reduce the number of parts required to assemble a given number of rectifier plates and to reduce the cost thereof.

Briefly, the invention is accomplished by mounting a plurality of rectifier plates and spacer washers upon a core of insulating material, the core being either solid or tubular, and to hold them in assembled relation by applying push-on spring lock nuts. One of the features of the invention is to combine into one element the push-on lock nut and the terminal strip while another feature is to provide certain of the lock nuts with an extension disposed for mounting purposes.

The above-mentioned and other features and objects of this invention and the manner of attaining them will become more apparent and the invention itself will be best understood, by reference to the following description of certain embodiments of the invention taken in conjunction with the accompanying drawings, wherein.

Figure 1:
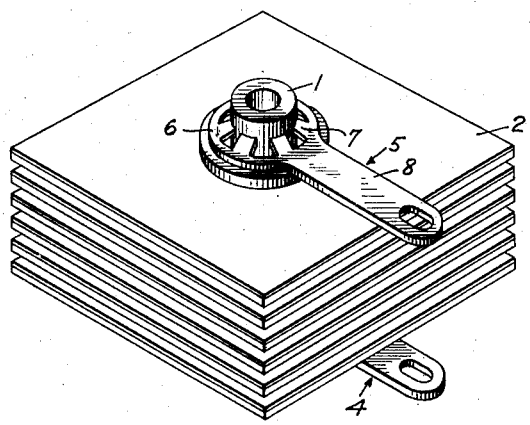
Fig. 1 is a view in perspective of a rectifier stack made in accordance with my invention.
Figure 2:
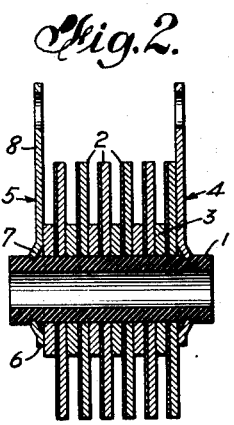
Fig. 2 is a longitudinal sectional view of the stack shown in Fig. 1.
Figure 3:
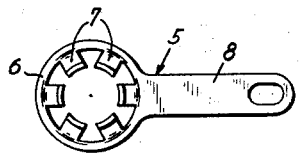
Fig. 3 is a plan view of one of the combination push-on lock nuts and a terminal strip.

Referring to Figs. 1, 2 and 3 of the drawing, the new rectifier stack assembly of my invention includes in the preferred embodiment a core comprising a length of tubing 1 of insulating material, either fiber or plastic. The tubing may be obtained in long lengths and cut up in the sizes required depending upon the number of rectifier plates to be mounted thereon. Rectifier plates 2, either rectangular, round or of other shape are slid onto the tubing with spacer washers 3 disposed between adjacent rectifiers.

The rectifier plates 2 are preferably of the type known as selenium rectifiers, which are formed by known processes and comprise a base metal plate onto which is applied a thin layer of selenium and onto the selenium a coating of counter-electrode alloy. Interposed between the selenium and counter-electrode layer is formed a barrier layer, either by application onto the selenium of a barrier layer lacquer prior to application of the alloy layer, or by vapor fuming or other process.

While the rectifier plates may be placed in direct contact and in some assemblies it is of advantage to so place certain of the rectifiers, ordinarily they are preferably spaced apart by metallic spacer washers 3 for better liberation of the heat generated in the plates during use. The assembly of rectifier plates and washers is held tightly upon the tubing 1 by means of push-on spring lock nuts 4 and 5. The lock nuts 4 and 5 are provided with inwardly projecting lugs disposed at a slight angle to the plane of the nut, so that when the nuts are forced upon the tubing the lugs are disposed rearwardly thereof so as to dig into the surface of the tubing should any force be exerted to remove them backwardly off the tubing.

As viewed in Figs. 2 and 3 the lock nuts 4 and 5 comprise a circular body 6 having a central opening with a plurality of lugs 7 projecting inwardly and disposed at a slight angle to the plane of the body 6. The body 6 is also provided with an extension 8 which constitutes a terminal for making electrical connections. The inclination of the lugs 7 is such that it will permit the movement of the lock nut in one direction on the tubing but will oppose movement in the opposite direction by digging into the surface of the tubing. The lugs 7 also provide resilience so as to accommodate expansion and contraction of the plates and spacer washers due to heating and cooling when in use. This resilience is sufficient to accommodate the expansion and contraction during normal use thus preventing the assembly from becoming loose.

Figure 4:
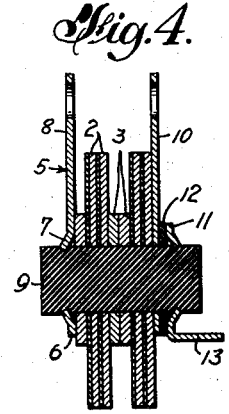
Fig. 4 is a longitudinal sectional view of a rectifier stack showing a modification of the invention.

Referring to Fig. 4, the core is shown to comprise a solid rod, as indicated at 9, of insulating material, either fiberous or plastic. One of the terminals 10 is shown separate from the associated lock nut 11 with an insulating washer 12 disposed therebetween. The lock nut is made separate from the terminal 10 and provided with an extension 13 disposed at right angles to the body of the lock nut so that it may be used for mounting the rectifier stack upon a chassis. In this embodiment the rectifiers are grouped in pairs (and if desired three or more may be grouped together) and the two pairs separated by one or more washers 3. Thus, a smaller assembly is obtained.

From the foregoing description of my new "low cost" rectifier stack it will be readily seen that several advantages are present in my new construction over those heretofore practiced. For example, the tie bolt or metallic eyelet, an insulating sleeve and several insulating washers are replaced by a simple insulating core cut any size desired from stock and a pair of lock nuts capable of being easily pushed onto the ends of the core. In addition, the separate terminal strips and mounting brackets heretofore required are eliminated by my provision of extensions on the lock nut which serve as electrical terminals and means for mounting the assembly on a chassis or other support.

While I have described above the principles of my invention in connection with specific apparatus, it is to be clearly understood that this description is made only by way of example and not as a limitation to the scope of my invention.

What I claim is:

A rectifier stack assembly comprising a core of insulating material, a plurality of rectifier plates each having an opening therethrough, a plurality of metallic washers, said plates and washers being disposed upon said core, with a washer between at least certain of said plates and a pair of resilient lock nuts each having an opening therethrough with inwardly disposed spring lugs adapted when the lock nut is applied to said core to grip the surface of the core and thereby hold the plates and washers in assembled relation, while permitting limited axial movement against the action of the spring lugs, the diameter of said lock nut being substantially equal to the diameter of the separating washers, whereby the axial holding and contacting pressure exerted by said nut is transmitted through said stack against the individual plates by said washers, one of the lock nuts being provided with a part extending laterally thereof to provide an electric terminal for the assembly and the other lock nut being provided with a part extending outwardly from the assembly by which the assembly may be mounted on a support, a terminal strip received upon said core at the end of the assembly containing the lock nut having an extension for mounting purposes and an insulating washer disposed between such lock nut and the rest of the assembly.

ALTON S. VANDERHOOF.

References Cited in the file of this patent:

UNITED STATES PATENTS

| Number | Name | Date |
|---|---|---|
| 1,654,668 | Shoemaker | Jan. 3, 1928 |
| 1,801,836 | Aumann | Apr. 21, 1931 |
| 2,134,131 | Kipphan | Oct. 25, 1938 |
| 2,302,087 | Addink et al. | Nov. 17, 1942 |
| 2,400,647 | Kohring | May 21, 1946 |
| 2,483,801 | Becwar | Oct. 4, 1949 |

FOREIGN PATENTS

| Number | Country | Date |
|---|---|---|
| 518,127 | Great Britain | Feb. 19, 1940 |